(12) United States Patent
Santos Soto et al.

(10) Patent No.: US 9,546,008 B1
(45) Date of Patent: Jan. 17, 2017

(54) MINIATURE RELEASE MECHANISM OR DIMINUTIVE ASSEMBLY FOR NANOSATELLITE DEPLOYABLES (DANY)

(71) Applicants: Luis H. Santos Soto, Greenbackville, VA (US); Scott V. Hesh, Greenbackville, VA (US); John D. Hudeck, Pocomoke, MD (US)

(72) Inventors: Luis H. Santos Soto, Greenbackville, VA (US); Scott V. Hesh, Greenbackville, VA (US); John D. Hudeck, Pocomoke, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 73 days.

(21) Appl. No.: 14/501,724

(22) Filed: Sep. 30, 2014

Related U.S. Application Data

(60) Provisional application No. 62/013,164, filed on Jun. 17, 2014.

(51) Int. Cl.
  *B64G 1/22* (2006.01)
  *B64G 1/44* (2006.01)

(52) U.S. Cl.
  CPC ............... *B64G 1/222* (2013.01); *B64G 1/443* (2013.01)

(58) Field of Classification Search
  CPC ......... B64G 1/222; B64G 1/443; B64G 1/503; B64G 1/64; B64G 1/641; Y10T 24/45461; E05B 47/0009; E05B 51/005; E05B 65/104; E05B 65/0075; E05B 65/0078; E05B 65/0082; F03G 7/065; H01L 23/345
  See application file for complete search history.

(56) References Cited

U.S. PATENT DOCUMENTS

| | | | | |
|---|---|---|---|---|
| 4,540,873 A | * | 9/1985 | Kester | B64G 1/222 219/200 |
| 5,245,738 A | * | 9/1993 | Johnson | B23P 11/025 29/413 |
| 5,402,728 A | * | 4/1995 | Garner | F42B 3/006 102/223 |

(Continued)

OTHER PUBLICATIONS

Thurn, Adam, et al. "A Nichrome burn wire release mechanism for CubeSats." 41st Aerospace Mechanisms Symposium, Pasadena, California, USA. 2012.*

(Continued)

*Primary Examiner* — Tien Dinh
*Assistant Examiner* — Alexander V Giczy

(57) ABSTRACT

Miniature release mechanisms constrain objects, such as deployables during the launch of space vehicles, such as small satellites and nanosatellites, and enable the release of the objects once a desired destination is reached by the space vehicle. Constraint and release of the objects are achieved by providing a secure threaded interface that may be released by the release mechanisms. The release mechanisms include a housing structure; a release block can include a threaded interface; one or more retracting pins; one or more release springs; a breakable link, such as a plastic link; a cable harness clamp; and a circuit board. The release mechanism can be 0.1875 inches (approximately 4.8 mm) thick.

20 Claims, 14 Drawing Sheets

(56) References Cited

U.S. PATENT DOCUMENTS

| | | | | | |
|---|---|---|---|---|---|
| 5,829,253 | A | * | 11/1998 | Long | B64G 1/64 411/909 |
| 6,133,818 | A | * | 10/2000 | Hsieh | B64G 1/222 337/1 |
| 6,287,039 | B1 | * | 9/2001 | Leconte | B64G 1/641 244/158.1 |
| 6,439,122 | B1 | * | 8/2002 | Nygren | B64G 1/002 102/348 |
| 6,450,064 | B1 | * | 9/2002 | Christiansen | B64G 1/645 403/343 |
| 6,479,800 | B1 | * | 11/2002 | Bueno Ruiz | B64G 1/222 219/200 |
| 6,747,541 | B1 | * | 6/2004 | Holt | B64G 1/645 337/1 |
| 7,422,403 | B1 | * | 9/2008 | Johnson | B23P 11/025 411/392 |
| 2003/0071712 | A1 | * | 4/2003 | Valembois | B64G 1/222 337/401 |
| 2006/0088366 | A1 | * | 4/2006 | Retat | B64G 1/222 403/28 |
| 2010/0139264 | A1 | * | 6/2010 | Lyman | F03G 7/065 60/527 |
| 2010/0215424 | A1 | * | 8/2010 | Crookston | B64G 1/222 403/6 |
| 2012/0112010 | A1 | * | 5/2012 | Young | B64G 1/641 244/173.1 |
| 2015/0050078 | A1 | * | 2/2015 | Laughlin | B64G 1/222 403/327 |
| 2015/0084353 | A1 | * | 3/2015 | Koehler | E05B 47/0009 292/336.3 |
| 2015/0285228 | A1 | * | 10/2015 | Koehler | F03G 7/065 74/2 |
| 2015/0344157 | A1 | * | 12/2015 | Horie | B64G 1/641 225/96 |

OTHER PUBLICATIONS

Lucy, M. H., et al. "Report on Alternative Devices to Pyrotechnics on Spacecraft." (1996).*

Huett, Brett, and Cliff Willey. "Design and development of miniature mechanisms for small spacecraft." (2000).*

* cited by examiner

MINIATURE RELEASE MECHANISM OR DIMINUTIVE ASSEMBLY FOR NANOSATELLITE DEPLOYABLES (DANY)

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

FIELD OF THE INVENTION

The present invention relates to release mechanisms, and more particularly to release mechanisms for securing deployables to small satellites and nanosatellites.

BACKGROUND OF THE INVENTION

Non-traditional spacecraft, such as small satellites and nanosatellites, are increasing in their rate of use for space based research. These small satellites and nanosatellites, such as CubeSats, are often constrained in pre-deployment size and weight, requiring the entire spacecraft to fit into a standardized deployment mechanism. For example, a 2U CubeS at may be required to fit into a 20 cm×10 cm×10 cm space prior to deployment. Once deployed, small satellites and nanosatellites often increase in size from their pre-deployment state by extending deployables, such as solar panels, antennas, etc.

The requirement to fit into such small spaces prior to deployment has limited the ability to constrain these deployables to the small satellites and nanosatellites, because traditional restraint mechanisms utilize a considerable amount of precious internal space of the small satellites and nanosatellites. To avoid dedicating internal space of the small satellites and nanosatellites, past designs have secured the deployables to the exterior of the small satellites and nanosatellites by looping the deployables and the small satellites and nanosatellites in monofilament line (i.e., fishing line). A burning wire is then activated after the small satellites and nanosatellites are deployed to melt the monofilament line and release the deployables. While tying the deployables down with monofilament line does not sacrifice internal space of the small satellites and nanosatellites to securing deployables prior to launch, the process of burning through the monofilament line is unpredictable and unreliable and the monofilament line is prone to stretching. Additionally, the small satellites and nanosatellites secured with monofilament line wrapped around them often fail to provide a rigid preload interface and the deployables can rattle leading to potential damage and other vibration issues. Therefore, a predictable and reliable release mechanism that does not utilize internal space of the small satellites and nanosatellites is needed.

SUMMARY

The various embodiments may provide release mechanisms to constrain objects, such as deployables, during the launch of space vehicles, such as small satellites and nanosatellites, and enable the release of the objects once a desired destination is reached by the space vehicle. The various embodiments may achieve the constraint and release of the objects by providing a secure threaded interface that may be released by the release mechanisms. The various embodiment release mechanisms may comprise: a housing structure; a release block that may include a threaded interface; one or more retracting pins; one or more release springs; a breakable link, such as a plastic link; a cable harness clamp; and a circuit board. In an embodiment, the size or thickness of the release mechanism may be 0.1875 inches (approximately 4.8 mm).

The various embodiments may provide a release mechanism for a satellite, comprising: a housing structure configured to be affixed to a frame of the satellite, the housing structure including at least one cutout configured to receive a release block attached to a deployable of the satellite; at least one retracting pin supported in the housing structure; at least one release spring configured to exert force on the at least one pin and housing structure; a breakable link configured to hold the at least one retracting pin such that the at least one release spring is compressed and the at least one retracting pin at least partially extends through the housing structure and the release block to hold the release block in the at least one cutout and couple the release block to the housing structure; and a circuit board connected to the housing, the circuit board including at least one heating device configured to heat the breakable link to compromise the breakable link such that the at least one release spring retracts the at least one retracting pin from the release block to uncouple the release block from the housing structure.

The various embodiments may provide a method for releasing a deployable from a satellite, comprising: affixing the deployable to a frame of the satellite via a release mechanism comprising: a housing structure attached to the frame and including at least one cutout having a release block therein, the release block attached to the deployable; at least one retracting pin supported in the housing structure; at least one release spring exerting force on the at least one pin and housing structure; a breakable link holding the at least one retracting pin such that the at least one release spring is compressed and the at least one retracting pin at least partially extends through the housing structure and the release block to hold the release block in the at least one cutout and couple the release block to the housing structure; and a circuit board connected to the housing, the circuit board including at least one heating device; and applying a current to the heating device to cause the heating device to generate heat to compromise the breakable link such that the at least one release spring retracts the at least one retracting pin from the release block to uncouple the release block from the housing structure and release the deployable.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
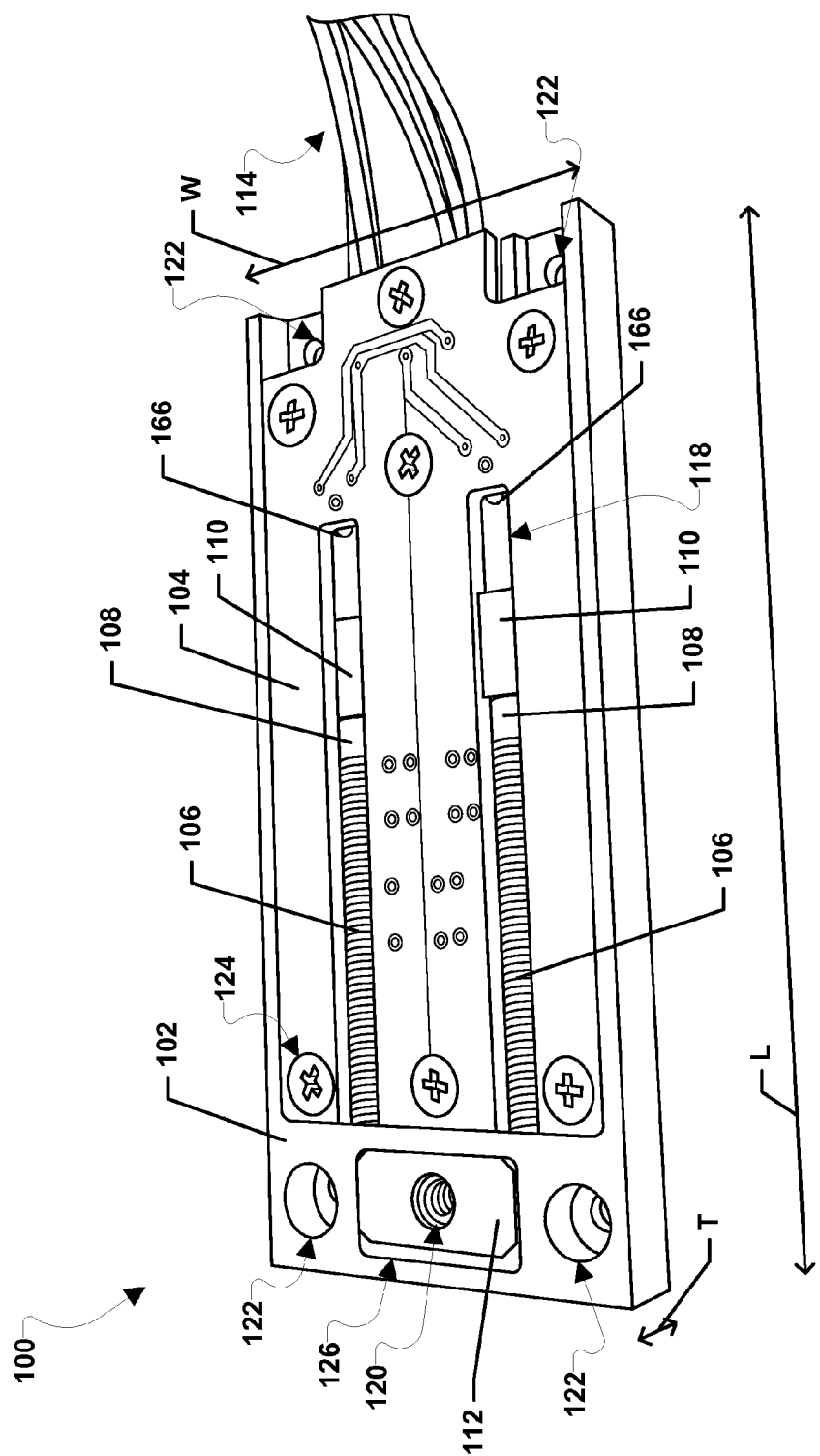
FIG. 1 is an isometric view of an embodiment release mechanism.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide release mechanisms for securing deployables, such as solar panels, antennas, etc., to small satellites and nanosatellites, such as CubeSats, that do not use internal space of the small satellites and nanosatellites. The various embodiment release mechanisms may be fastened to the chassis of the small satellites and nanosatellites, and may provide a preloaded interface, such as a threaded interface, to attach deployables to the small satellites and nanosatellites. After actuation of the various embodiment release mechanisms, a release block connected to the deployable may be released from the release mechanisms, allowing the deployable to be deployed. The various embodiment release mechanisms may be small enough to fit in the external volume of small satellites and nanosatellites, for example the external volume of a CubeSat. Specifically, the various embodiments may have a thickness of no more than 0.1875 inches (approximately 4.8 mm), enabling a deployable with a thickness of 0.0625 inches to be secured by the various embodiments in a CubeS at external volume that is about 0.25 inches thick.

The various embodiments may provide release mechanisms to constrain objects, such as deployables, during the launch of space vehicles, such as small satellites and nanosatellites, and enable the release of the objects once a desired destination is reached by the space vehicle. The various embodiments may achieve the constraint and release of the objects by providing a secure threaded interface that may be released by the release mechanisms. The various embodiment release mechanisms may comprise: a housing structure; a release block that may include a threaded interface; one or more retracting pins; one or more release springs; a breakable link, such as a plastic link; a cable harness clamp; and a circuit board. The circuit board may be a populated circuit board including resistors, switches, and one or more heating device, such as nichrome wires. A wiring harness including various wires may be soldered to the circuit board to provide power and/or data connections. The wires may be un-terminated wires or end in any type connector.

In the various embodiments, the release block's threaded interface may provide an attachment point to the object to be constrained by the release mechanism, and may remain on the object to be constrained after deployment. The release block may be held by the release mechanism during the constraining period and released by the release mechanism during the release period. In various embodiments, the one or more retracting pins, such as two retracting pins, may hold the release block in the housing structure. In an embodiment, the retracting pin or pins may extend through the housing toward the release block to secure the release block during the constraining period and a first portion of the pin, such as half of the pin width, may extend into the release block and a second portion of the pin, such as the other half of the pin width, may extend into the housing structure. The retracing pin or pins may be spring loaded and may be held in the extended position into the release block during the constraining period by the breakable link, such as a plastic link, which may hold the release springs in a compressed state. In the various embodiments, the heating device, such as nichrome wires, may heat the breakable link, such as a plastic link, to compromise the breakable link. In an embodiment, the heating device may use 4 Amps at 3.3 Volts for a total of 13. 2 Watts for 0 to 2 seconds to heat the breakable link to compromise (e.g., break) the breakable link. Once the strength of the breakable link is compromised, the compressed released springs may push the retracting pin or pins at least partially out of the housing, removing the retracting pin or pins from the release block and enabling the release block to separate from the release mechanism. In various embodiments, the release mechanism may include one or more switch, such as two redundant switches, that may confirm the operation of the release mechanism. In various embodiments, the release mechanism may be refurbishable by replacing the compromised breakable link with a new breakable link.

In an embodiment, the size or thickness of the release mechanism may be 0.1875 inches (approximately 4.8 mm). The other two dimensions of the release mechanism may be 1.250 inches by 2.875 inches (approximately 31.8 mm by 73.0 mm). The various embodiments may provide at least 1.75 Amps for about 10 seconds to the heating device to compromise the breakable link. Specifically, the various embodiments may provide 4 Amps for less than 1 second to the heating device to compromise the breakable link. The various embodiments may be able to withstand 125 pound force or more on the release block while resting in the constrained configuration and may be able to withstand 12 pound force on the release block during release operations. A maximum preload force of 3 pounds may ensure a 99.999999% success rate in release of the releasing mechanism. A maximum static load that may be able to be withstood by the release mechanism before destruction of the release mechanism may be 300 pound force.

FIG. 1 is an isometric view of an embodiment release mechanism 100 for securing deployables, such as solar panels, antennas, etc., to spacecraft, such as small satellites and nanosatellites (e.g., CubeSats), that does not use internal space of the small satellites and nanosatellites. The release mechanism 100 may comprise a housing structure 102. The housing structure 102 may be comprised of a metal, such as an aluminum alloy. The housing structure 102 may include a series of attachment points 122 enabling the housing structure 102 of the release mechanism 100 to be attached, such as screwed or bolted, to an external surface of a spacecraft. The housing structure 102 may also include a cutout 126 configured to receive a release block 112, such that the release block 112 is disposed within the housing structure 102. The release block 112 may include an interface, such as a threaded interface 120, for attaching the release block 112 to an object, such as a deployable. Two retracing pins 108 aligned on each side of the release block 112 may extend through a portion of the housing structure 102 into the release block 112 to hold the release block 112 in the cutout of the housing structure 102 in the constrained (or pre-deployment) configuration. Pins 108 may be surrounded by release springs 106 which may exert force against the housing structure 102 and the pins 108. A release bracket 110 may contact the end of the pins 108 opposite the cutout 126 and in the constrained (or pre-deployment) configuration may exert force against the pins 108 to compress the release springs 106. The release bracket 110 may be rigidly connected to the pins 108, or the pins 108 and release bracket 110 may merely be held in close contact by the force of the release springs 106 pushing the pins 108 into the release bracket 110.

A circuit board 104, such as a populated printed circuit board (PCB) may cover the release mechanism 100 and may be secured to the housing by a series of screws 124. The circuit board 104 may include two cutouts 118 configured to contact protrusions on the release bracket 110 and act as channel guides restricting the movement of the release bracket 110, release springs 106, and retracting pins 108 to movement along the length of the release mechanism 100. The underside of the circuit board 104 may support two switches 166 that may align with the release bracket 110 of the release mechanism 100 and may be connected to wires of the wiring harness 114 of the release mechanism. In the un-constrained (or deployed) configuration the release bracket 110 may be driven by the pins 108 being pushed by the release springs 106 into the switches 166 to cause the switches 166 to send signals via the wiring harness 114 indicating the retracting pins 108 were successfully retracted from the release block 112 and activation of the release mechanism 100 was successful.

In an embodiment, the thickness T of the release mechanism 100 may be approximately 0.1750 to 0.1900 inches, such as 0.1800 inches to 0.1900 inches, 0.1875 inches (approximately 4.8 mm), etc. In an embodiment, the width W of the release mechanism 100 may be approximately 1.200 inches to 1.300 inches, such as 1.250 inches (approximately 31.8 mm). In an embodiment, the length L of the release mechanism 100 may be approximately 2.500 inches to 3.00 inches, such as 2.875 inches (approximately 73.0 mm).

Figure 2:
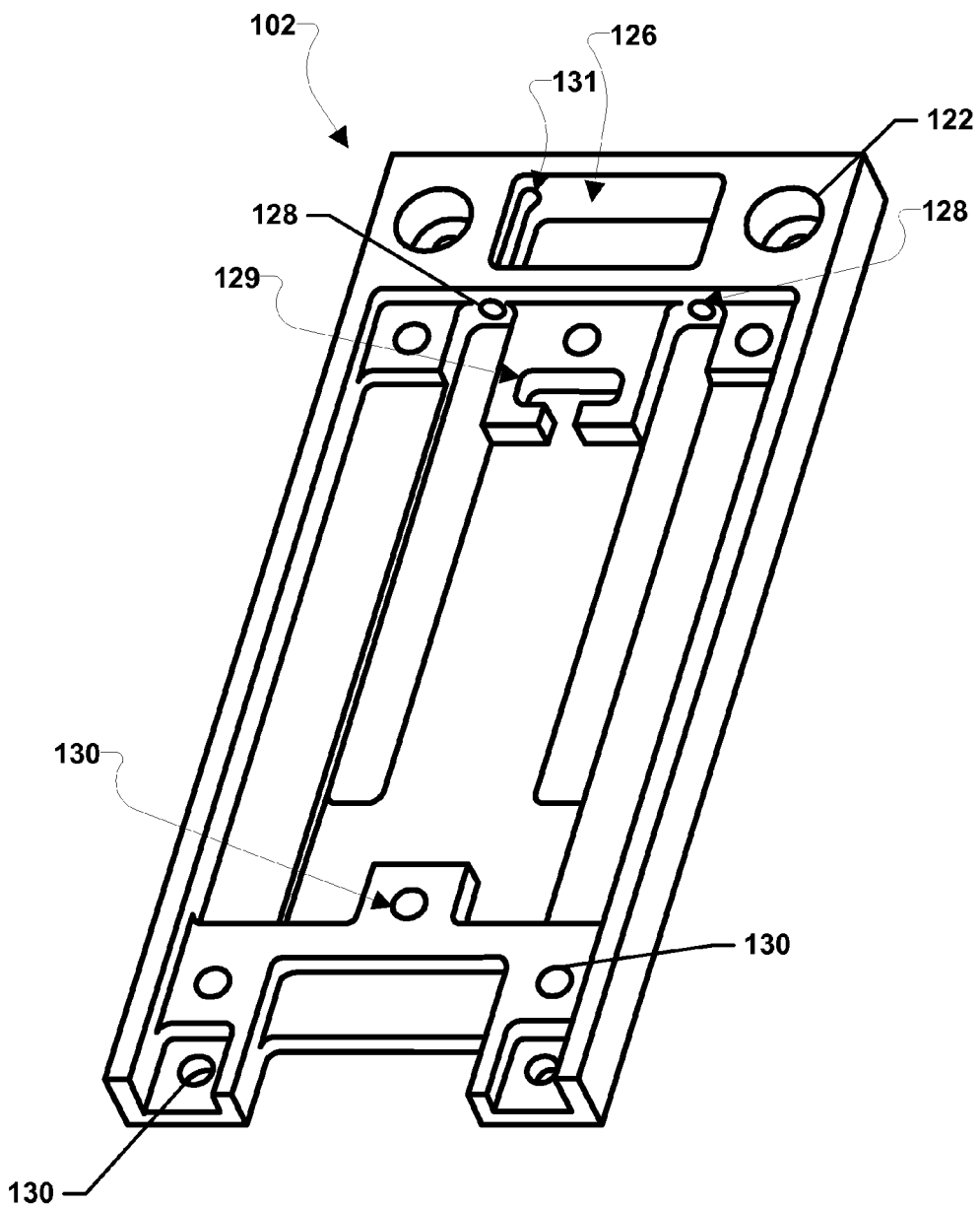
FIG. 2 is an isometric view of the housing structure of the release mechanism illustrated in FIG. 1.

FIG. 2 is an isometric view of the housing structure 102 of the release mechanism 100 illustrated in FIG. 1. As shown in FIG. 2, holes 128 in the housing structure 102 may pass through to the cutout 126 and may form openings 131 in the cutout 126. In this manner, the retracting pins 108 may pass through the holes 128 in the housing structure 102 and a portion of the retracting pins 108 may extend out of the openings 131 on either side of the cutout 126 to contact the release block 112 when it is seated in the cutout 126. The housing structure 102 may be configured to form a bracket 129 oriented such that its opening extends away from the cutout 126. Additionally, the housing structure 102 may include various attachment points 130, such as threaded holes, to which the circuit board 104 may be attached to the housing structure 102. In the various embodiments, the cutout 126 may have different sizes and shapes. In an embodiment, the cutout 126 may be a recess formed in the housing structure 102 measuring approximately 0.556 inches by 0.290 inches. In an embodiment, the cutout 126 may pass all the way through the housing structure 102. In other embodiments, the cutout 126 may not be a hole through the housing structure 102, and the depth may be selected to match the thickness of the release block 112.

Figure 3:
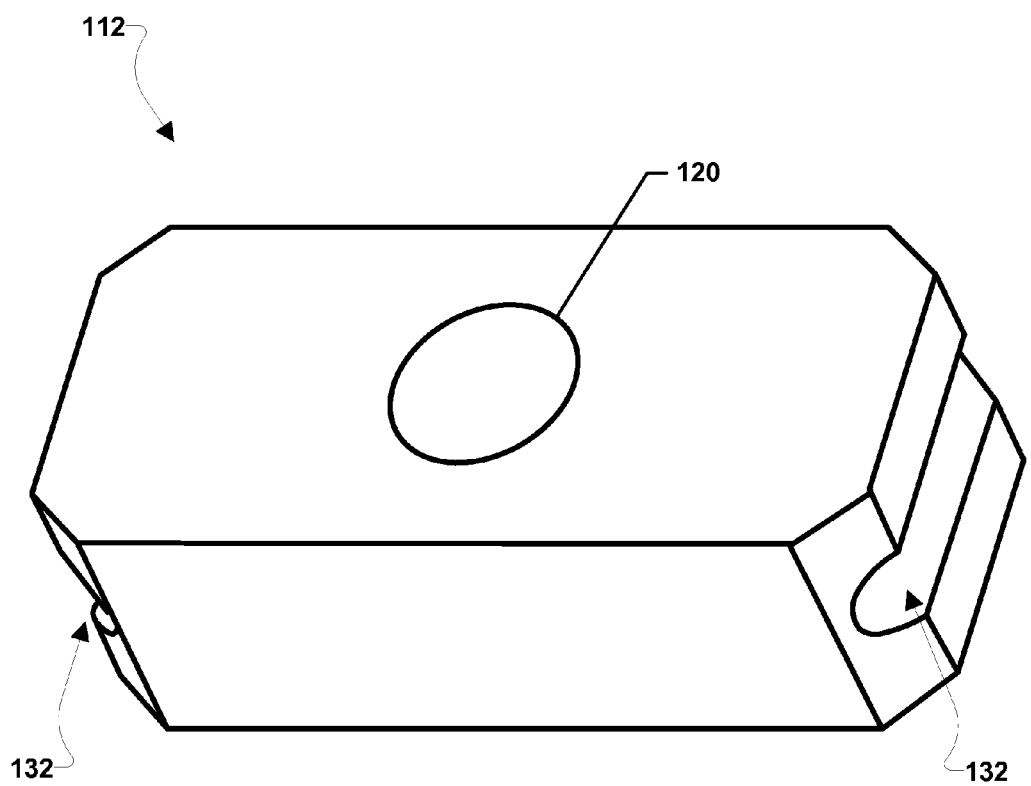
FIG. 3 is an isometric view of the release block of the release mechanism illustrated in FIG. 1.

FIG. 3 is an isometric view of the release block 112 of the release mechanism 100 illustrated in FIG. 1. The release block 112 may include the interface, such as threaded interface 120, which may act as an attachment point to enable the deployable to be affixed to the release block 112 (e.g., screwed or bolted to the release block 112). Additionally, the release block 112 may include two channels 132 cutout of opposite sides of the release block 112. The channels may allow the retracting pins 108 to at least partially pass through the release block 112 to hold the release block 112 into the housing structure 102 in the constrained (i.e., pre-deployment configuration). In an embodiment, the dimensions of the release block 112 may be 0.556 inches by 0.250 inches by 0.180 inches. In an embodiment, the release block 112 may be comprised of metal, such as an aluminum alloy, and the threaded interface 120 may be comprised of a Nitronic 60™ stainless steel insert.

Figure 4:
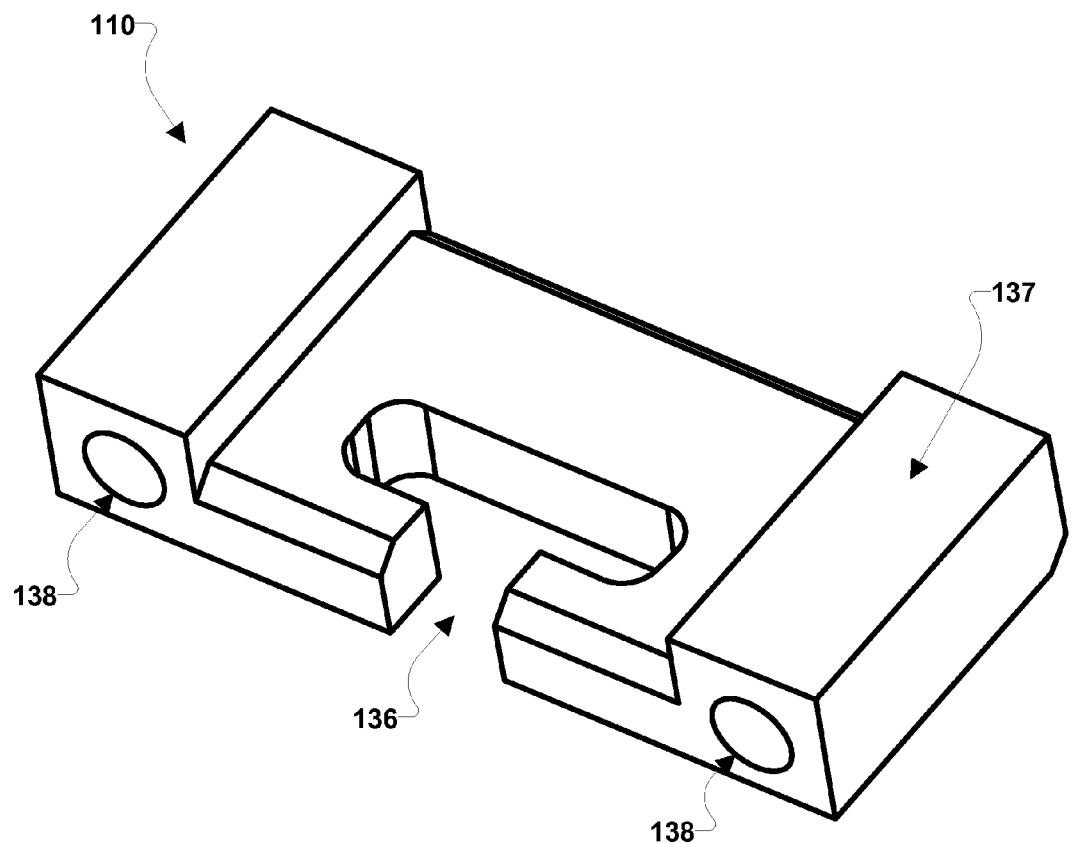
FIG. 4 is an isometric view of the release bracket of the release mechanism illustrated in FIG. 1.

FIG. 4 is an isometric view of the release bracket 110 of the release mechanism 100 illustrated in FIG. 1. The release bracket 110 may include two holes 138 that may receive ends of the retracting pins 108. The release bracket 110 may be configured to form a bracket 136 oriented such that its opening extends toward the side of the release bracket 110 on which holes 138 are formed. The release bracket 110 may also be configured to form two protrusions 137 that may extend into the cutouts 118 in the circuit board 104 when the release mechanism 100 is assembled. In an embodiment, the release bracket 110 may be comprised of metal, such as an aluminum alloy.

Figure 5:
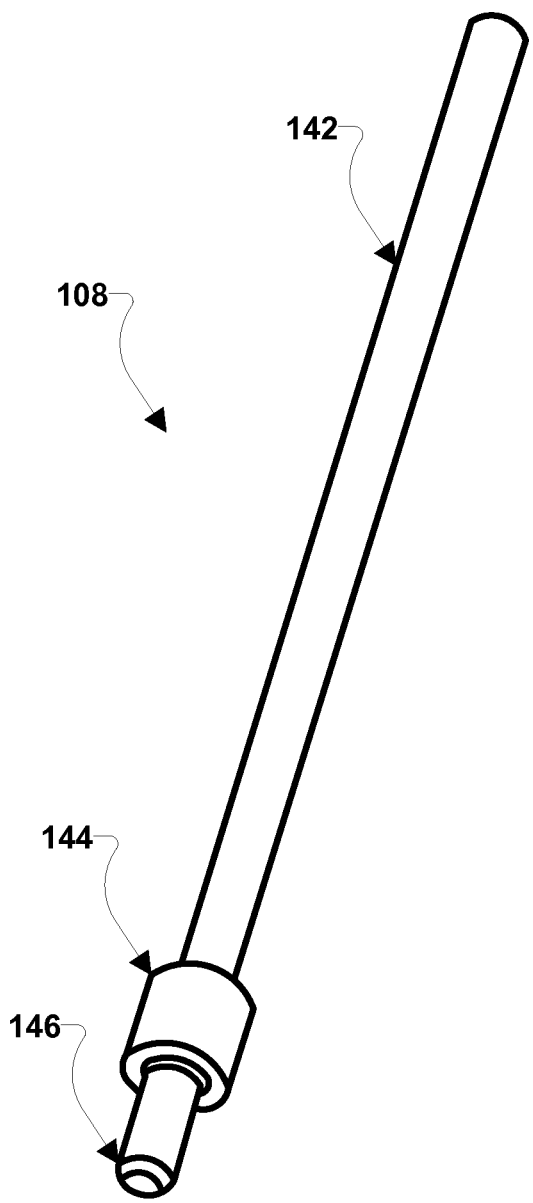
FIG. 5 is an isometric view of a retracting pin of the release mechanism illustrated in FIG. 1.

FIG. 5 is an isometric view of a retracting pin 108 of the release mechanism 100 illustrated in FIG. 1. As discussed above, in an embodiment, the release mechanism 100 may have two retracting pins 108. In other embodiments, release mechanism may have one pin, two pins, or more than two pins. The retracting pins 108 may include a main shaft portion 142 that may be inserted into the center of the release springs 106 and may extend through the holes 128 in the housing structure 102 to pass through the channels 132 in the release block 112 in the constrained (pre-deployment) configuration. A collar 144 may be formed opposite the end of the pin 108 that inserts into the release block 112 and may be configured to contact the release springs 106 to enable the release springs 106 to exert force against the pins 108 and drive the pins 108 out of the release block 112. A connecting shaft 146 may extend from the collar 144 and may be configured to fit in holes 138 of the release bracket 110. In this manner, the springs 108 may be held against the release bracket 110 and the collar 144 and/or connecting shaft 146 may exert force against the release bracket 110 when driven by the release springs 106 and/or the release bracket 110 may exert force against the collar 144 and/or connecting shaft 146, and thereby the release springs 106, in the constrained (pre-deployment) configuration. In an embodiment, the retracting pins 108 may be comprised of metal, such as steel.

Figure 6:
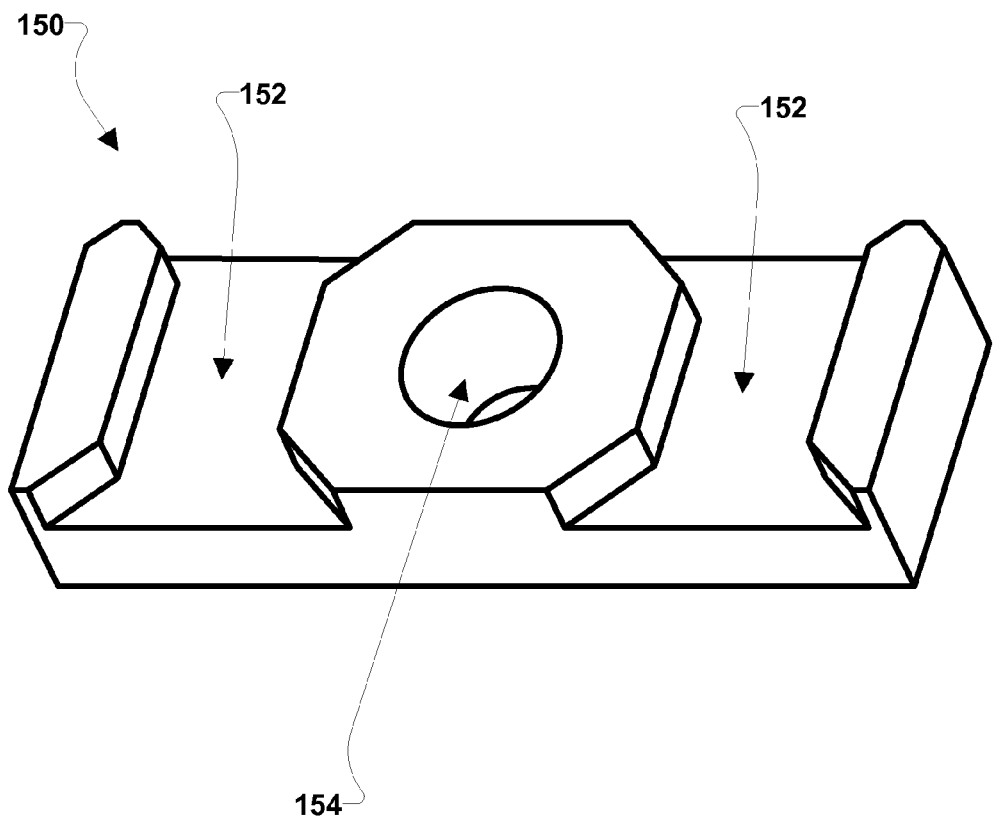
FIG. 6 is an isometric view of the cable harness clamp of the release mechanism illustrated in FIG. 1.

FIG. 6 is an isometric view of the cable harness clamp 150 of the release mechanism 100 illustrated in FIG. 1. The cable harness clamp 150 may be configured to form to pathways 152 for the wires of the wiring harness 114. The cable harness clamp 150 may include opening 154, such as a threaded opening, enabling the cable harness clamp to be affixed to the circuit board 104 and/or housing structure 102.). In an embodiment, the pathways 152 may separate the wires of the wiring harness 114 into two redundant groups of positive, negative, and signal wires. In an embodiment, the cable harness clamp 150 may be comprised of metal, such as an aluminum alloy, and the threads of the opening may be comprised of a Nitronic 60™ insert.

Figure 7:
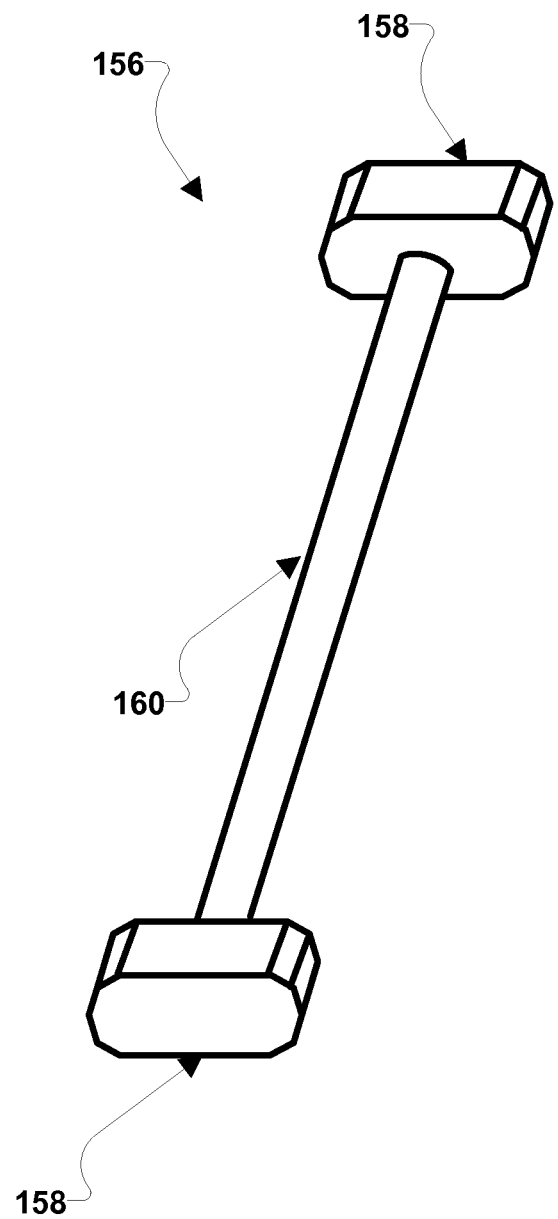
FIG. 7 is an isometric view of a breakable link according to an embodiment suitable for use with the release mechanism illustrated in FIG. 1.

FIG. 7 is an isometric view of a breakable link 156 according to an embodiment suitable for use with the release mechanism 100 illustrated in FIG. 1. The breakable link 156 may be comprised of a material that may be compromised by heating in 0 to 10 seconds, such as a rapid prototyping material, for example, Acrylonitrile butadiene styrene (ABS) plastic (e.g., ABSplus™, etc.). The breakable link 156 may be configured in a dumbbell or "I" type configuration with two flanges 158 connected by a shaft 160. The thickness of the breakable link 156 may vary based on applications of the release mechanism 100. A suitable thickness may be 0.050 inches with a capability of withstanding 11 pounds of force. The flanges 158 may be configured to fit into the brackets 129 and 136 on the housing structure 102 and release bracket 110, respectively. In the constrained (pre-deployment) configuration, the breakable link 156 may not yet be compromised (e.g., broken) and the breakable link 156 may hold the release bracket 110 to the housing structure 102 such that the release springs 106 remain compressed and the pins 108 extend through the housing structure 102 into the release block 112. When the breakable link 156 is compromised, the shaft 160 may break enabling the release bracket 110 to be driven away from the cutout 126 of the housing structure 102, thereby enabling the springs 106 to retract the pins 108 from the release block 112.

Figure 8:
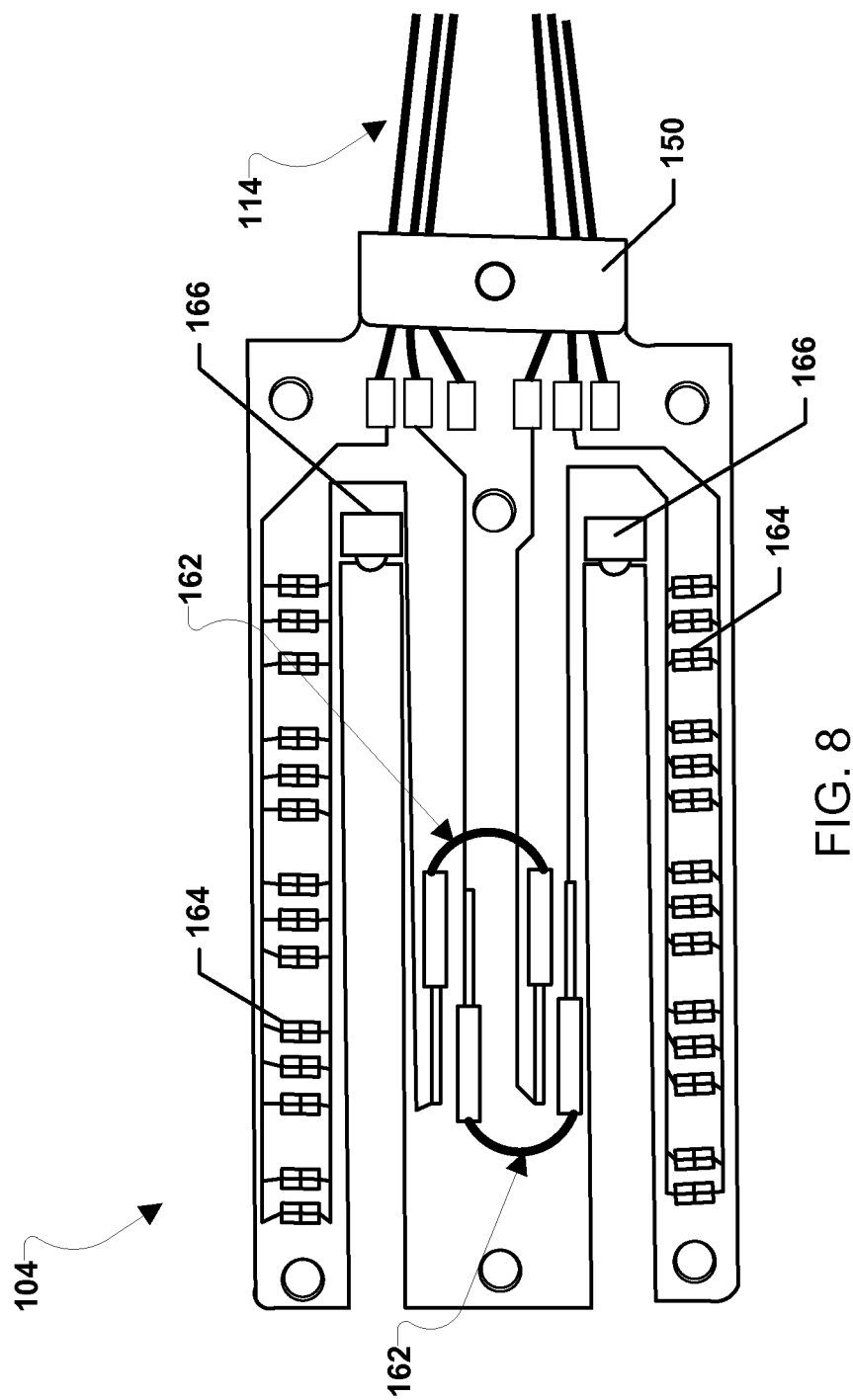
FIG. 8 is a component block diagram of the circuit board of the release mechanism illustrated in FIG. 1.

FIG. 8 is a component block diagram of the circuit board 104 of the release mechanism 100 illustrated in FIG. 1. FIG. 8 illustrates the underside of the circuit board 104, showing the placement of the switches 166 and the heating devices 162, such as nichrome wires. The heating devices 162 may be connected to a set of resistors 164, such as up to 18 resistors, such as 14 resistors, etc., to control the current provided to the heating devices 162 to a desired amount, such as at least 1.5 Amps, such as 3 Amps, 4 Amps, etc. In some configurations of the heating devices 162 the maximum current may be constrained by the capability of the heating devices 162. For example, nichrome wires may melt above a certain current, and the current maybe limited to 4.5 Amps or 4.0 Amps to avoid melting of the nichrome wires. Maximum current may also vary with pressure, and may be 3.1 Amps at lower pressures. The resistors 164 may be wired in parallel to adjust the overall resistance of the circuit for each heating device 162. The harness length of the wiring harness 114 may change the overall resistance of the system and the number of resistors may change for different missions to account for the change in overall resistance. As illustrated in FIG. 8, in an embodiment, two heating devices 162 may be provided, as well as two switches 166, and each switch and heating device pair may be provided with its own positive, negative, and signal wires. In this manner, the release mechanism 100 may provide redundant heating capability and redundant activation indication capability to increase the reliability of the release mechanism 100.

Figure 9A:
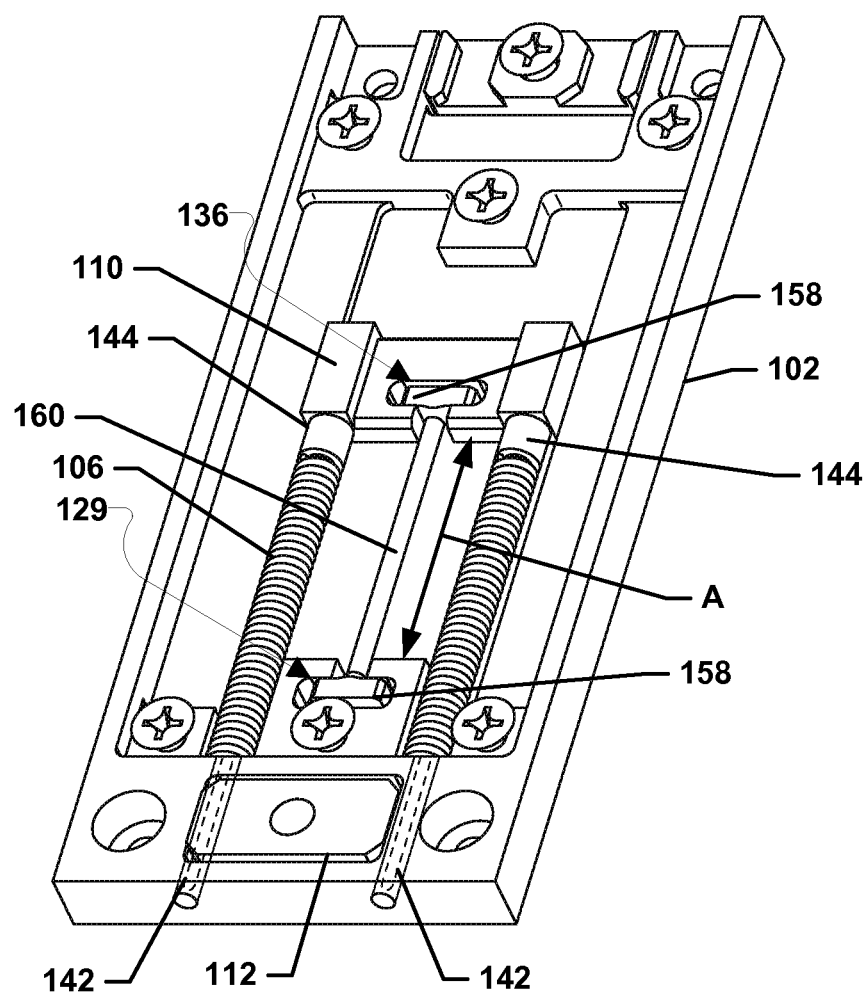
FIG. 9A is an isometric view of the release mechanism illustrated in FIG. 1 in a securing configuration prior to release.

FIG. 9A is an isometric view of the release mechanism 100 illustrated in FIG. 1 in a constrained (pre-deployment) configuration prior to release with the circuit board 104 removed for ease of illustration. In the constrained (pre-deployment) configuration the release bracket 110 may be held a distance A from the bracket 129 of the housing structure 102 by the breakable link 156. The release springs 106 may be compressed between the release bracket 110 and the housing structure 102 by the collars 144 of the pins 108. The main shafts 142 of the pins 108 may extend through the housing structure 102 and channels 132 of the release block 112 to hold the release block 112 in the cutout 126, thereby coupling the release block 112 to the housing structure 102. The breakable link 156 may be uncompromised and the flanges 158 connected by the shaft 160 may hold the release bracket 110 in position by exerting force on the respective brackets 136 and 129 of the release bracket 110 and housing structure 102. While not shown in FIG. 9A, the heating devices 162 may be positioned over the shaft 160 when the circuit board 104 is attached, and the switches 166 may be un-contacted and in an open circuit state in the constrained (pre-deployment) configuration/

Figure 9B:
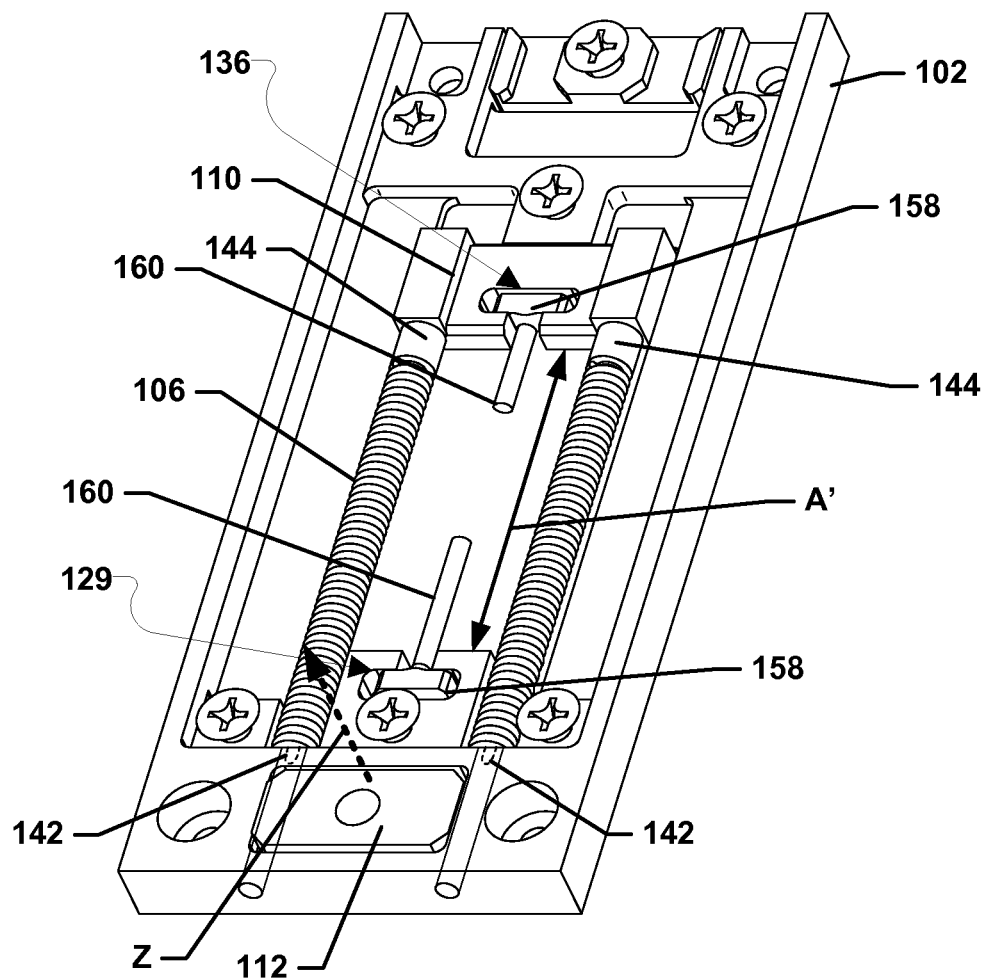
FIG. 9B is an isometric view of the release mechanism illustrated in FIG. 9A in a released configuration.

FIG. 9B is an isometric view of the release mechanism 100 illustrated in FIG. 9A in a released (deployed) configuration after heating of the breakable link 156 by the heating devices 162 with the circuit board 104 removed for ease of illustration. Heating of the shaft 160 of the breakable link 156 by the heating devices 162, such as nichrome wires, may compromise the strength of the breakable link 156, which may cause the shaft 160 to break or stretch in response to the heating and/or force exerted by the springs 106. When the shaft 160 breaks the force exerted by the compressed release springs 106 is no longer counteracted by the breakable link 156, thereby allowing the springs 106 to drive the collars 144 of the pins 108 and thereby the pins 108 and release bracket 110 away from the cutout 126. In the released (deployed) configuration the release bracket 110 may move to a farther distance A' away from the bracket 129 of the housing structure 102 and the release bracket 110 may contact the switches 166, thereby closing the switching circuit and causing the switches to indicate the successful activation of the release mechanism 100. As the release bracket 110 slides back, the main shafts 142 of the pins 108 may be retracted from the release block 112, enabling the release block 112 to be uncoupled from the housing structure 102 and float free of the release mechanism 100 in the Z direction. In this manner, a deployable may be released with the release block 112 still affixed. The release mechanism 100 may be reloaded and reused by recompressing the springs 106 and inserting a new breakable link 156.

Figure 10A:
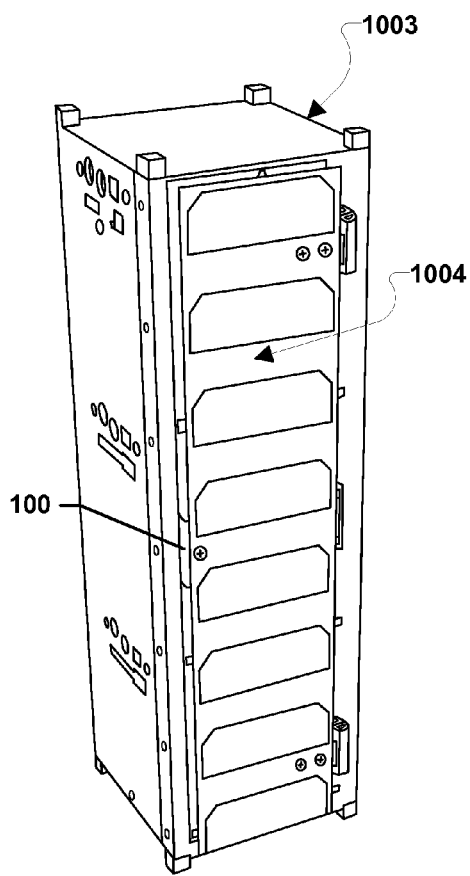
FIG. 10A is an isometric view of a nanosatellite deployable secured by the release mechanism illustrated in FIG. 1.

FIG. 10A is an isometric view of a nanosatellite deployable 1004 secured by the release mechanism 100 illustrated in FIG. 1. In a constrained (pre-deployment) configuration prior to release the release mechanism 100 may be between the nanosatellite frame 1003 and the deployable 1004, such as a solar panel. The housing structure 102 of the release mechanism 100 may be affixed to the frame 1003 and the release block 112 may be affixed to the underside of the deployable 1004. The release block 112 may be secured in the housing structure 102 by the pins 108, thereby securing the deployable 1004 to the frame 1003.

Figure 10B:
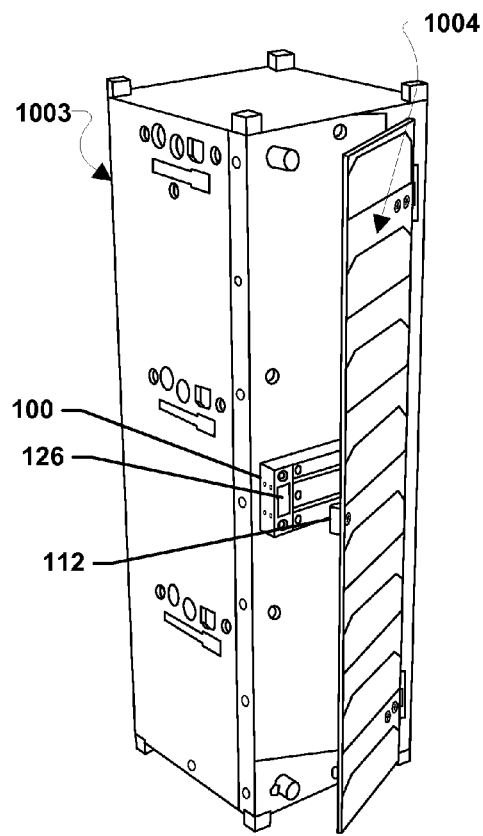
FIG. 10B is an isometric view of the nanosatellite deployable of FIG. 10A during a release period.

FIG. 10B is an isometric view of the nanosatellite deployable 1004 of FIG. 10A during a release period. The heating devices 162 may have been activated to compromise the breakable link 156, thereby causing the springs 106 to retract the pins 108 from the release block 112 and uncoupling the release block 112 from the housing structure 102. The release block 112 may then be removed from the cutout 126, enable the deployable 1004 to release from the release mechanism 100 and frame 1003. The housing structure 102 of the release mechanism 100 may remain on the frame 1003 of the nanosatellite while the release block 112 may remain of the deployable 1004.

Figure 11:
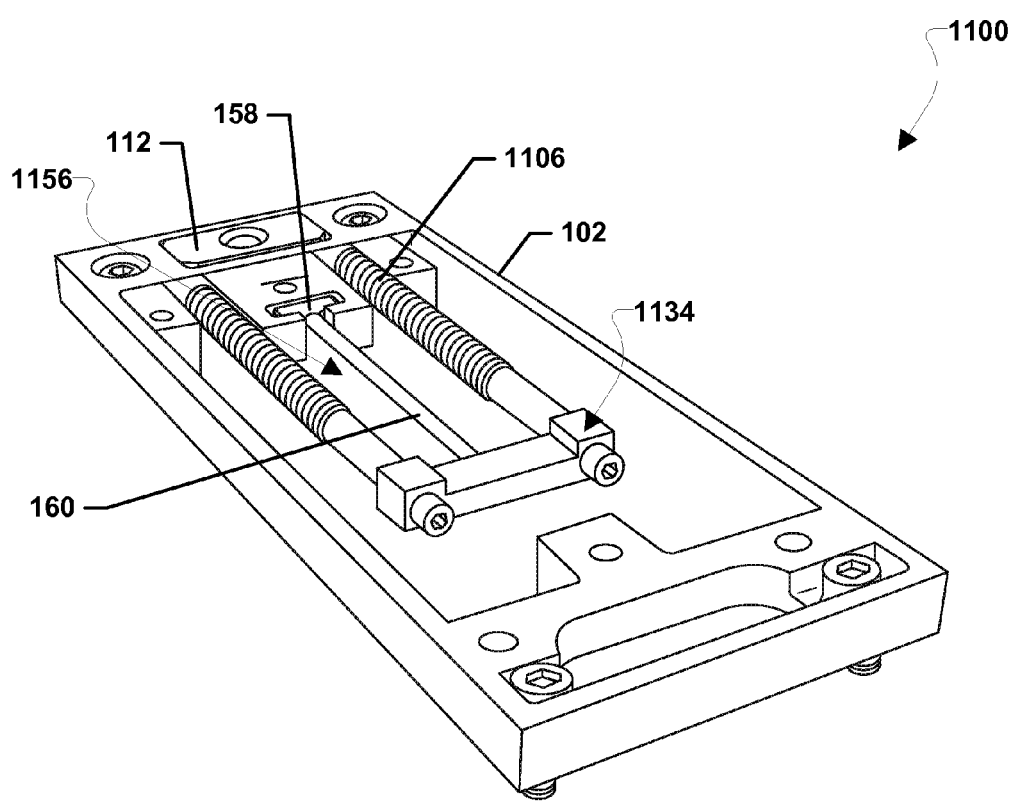
FIG. 11 is an isometric view of another embodiment release mechanism.

FIG. 11 is an isometric view of another embodiment release mechanism 1100. Release mechanism 1100 may be similar to release mechanism 100 described above, except that the release bracket 110 may be replaced by a flange 1134 of the breakable link 1156 that is configured in a manner similar to a release bracket. The flange 1134 may contact the pins 108 itself and the pins 108 may push directly on the flange 1134.

Figure 12A:
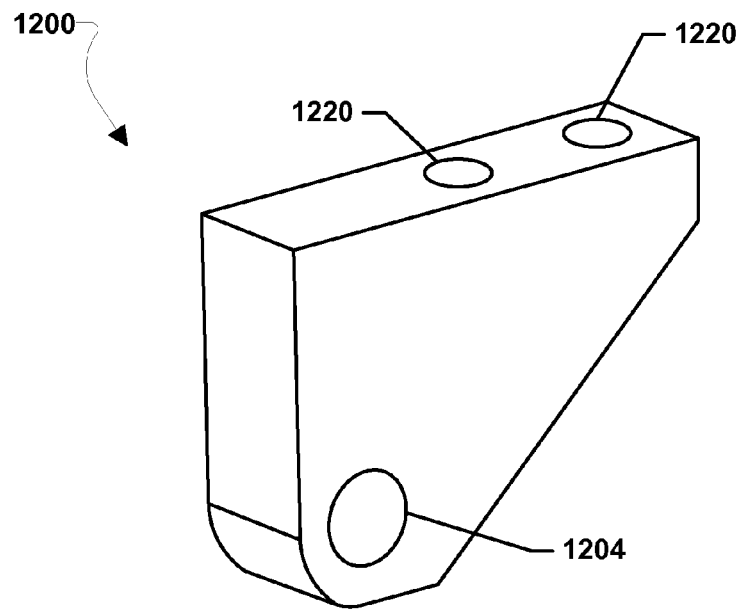
FIGS. 12A and 12B illustrate two different embodiment release blocks.
Figure 12B:
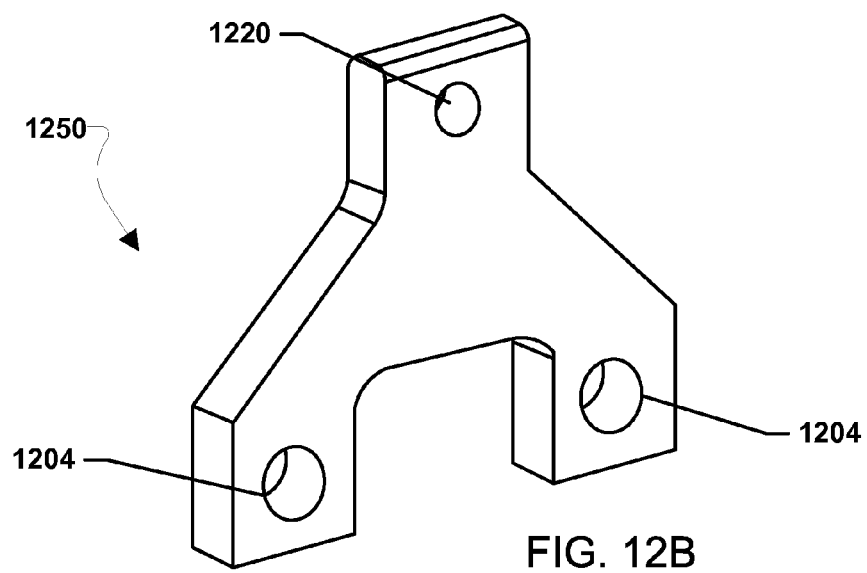
Figure 13:
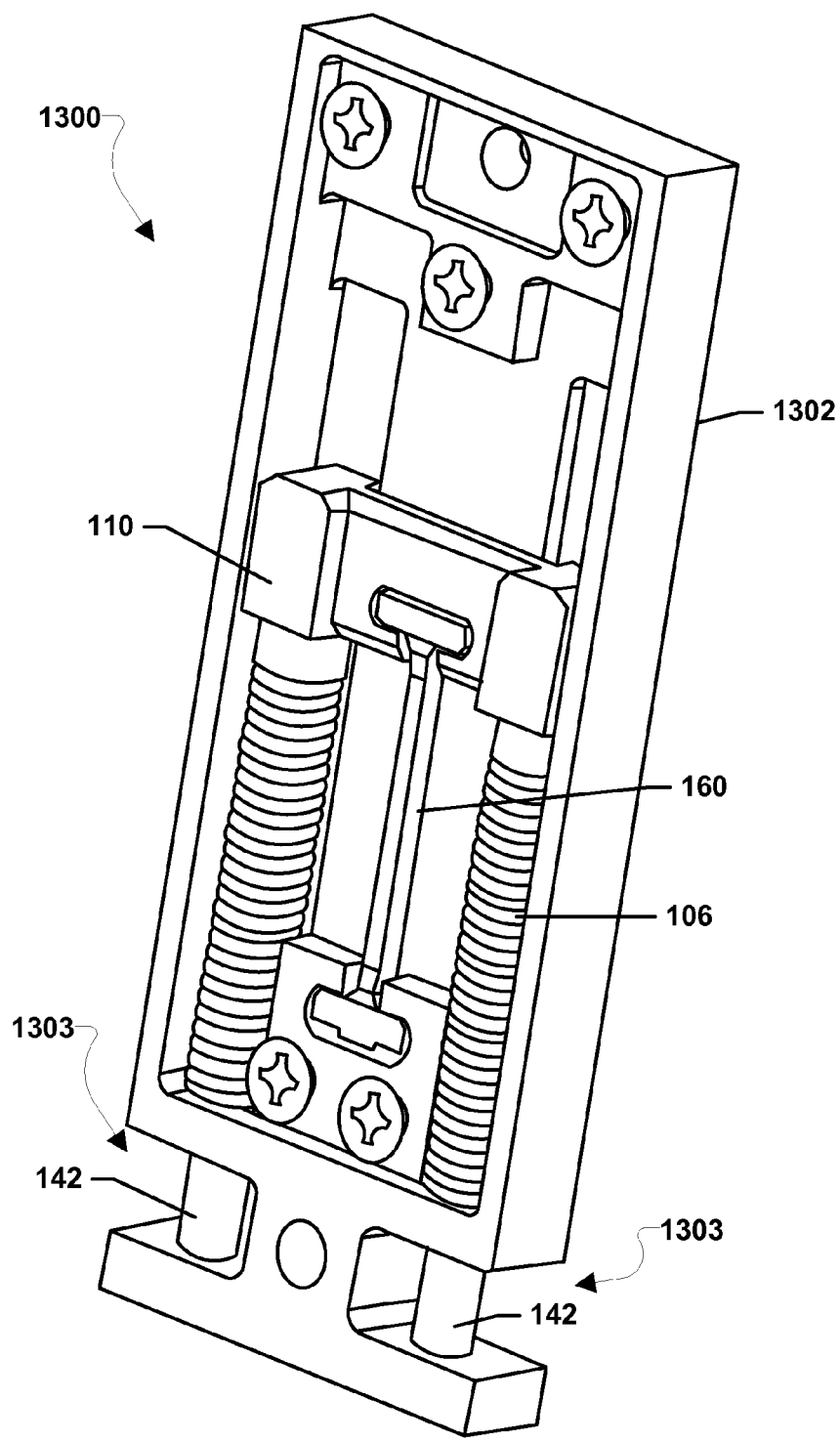
FIG. 13 is an isometric view of a third embodiment release mechanism.

FIGS. 12A and 12B illustrate two different embodiment release blocks 1200 and 1250, respectively, that may be suitable for use with the release mechanism 1300 illustrated in FIG. 13. Release block 1200 of FIG. 12A may include two threaded interfaces 1220 for attaching the release block 1200 to an object, such as a deployable. The release block 1200 may include a single passage 1204 for a pin to pass through to secure the release block 1200 to the housing structure 1302. Release block 1250 of FIG. 12B may include two passages 1204 for two pins to pass through to secure the release block 1200 to the housing structure 1302. The release block 1250 may include a threaded interface 1220 oriented in the same direction as the passages 1204. In this manner, the release block 1250 may enable the release block 1200 to be connected to an edge surface of a deployable.

FIG. 13 is an isometric view of a third embodiment release mechanism 1300. Release mechanism 1300 is similar to release mechanism 100 described above, except the housing structure 1302 is configured to form two cutouts 1303 on opposite outer edges of the release mechanism 1300. Each main shaft 142 of the pins 108 may extend through its own respective cutout 1303 to secure a release block, such as release blocks 1200 or 1250 described above.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

What is claimed is:

1. A release mechanism for a satellite, the release mechanism comprising:

a housing structure affixed to a frame of the satellite, the housing structure including at least one cutout that receives a release block attached to a deployable of the satellite;

at least one retracting pin supported in the housing structure;

at least one release spring that exerts force on the at least one pin and housing structure;

a breakable link that holds the at least one retracting pin such that the at least one release spring is compressed and the at least one retracting pin at least partially extends through the housing structure and the release block to hold the release block in the at least one cutout and couple the release block to the housing structure; and a circuit board connected to the housing, the circuit board including at least one heating device that heats the breakable link to compromise the breakable link such that the at least one release spring retracts the at least one retracting pin from the release block to uncouple the release block from the housing structure.

2. The release mechanism of claim 1, wherein:
the at least one retracting pin is two retracting pins; and
the at least one release spring is two release springs.

3. The release mechanism of claim 2, the release mechanism further comprising:
a release bracket connected to the two retracting pins, wherein:
the release bracket includes a first bracket;
the housing structure includes a second bracket; and
the breakable link holds the two retracting pins such that the two release springs are compressed by the breakable link exerting force on the first bracket and the second bracket.

4. The release mechanism of claim 3, wherein the breakable link is an "I" shaped breakable link.

5. The release mechanism of claim 4, wherein the breakable link is comprised of an Acrylonitrile butadiene styrene (ABS) plastic or a thermoplastic polymer.

6. The release mechanism of claim 3, wherein the at least one heating device comprises two nichrome wires.

7. The release mechanism of claim 6, the release mechanism further comprising:
at least two switches activated when the two release springs retract the two retracting pins from the release block to uncouple the release block from the housing structure.

8. The release mechanism of claim 7, wherein the release mechanism is no more than 0.1875 inches thick.

9. The release mechanism of claim 8, wherein the housing structure and the release block are comprised of aluminum alloy.

10. The release mechanism of claim 8, wherein the satellite is a small satellite or a nanosatellite.

11. The release mechanism of claim 10, wherein the deployable is a solar panel or an antenna.

12. The release mechanism of claim 2, wherein:
an end of the breakable link is connected to the two retracting pins;
the housing structure includes a bracket; and
the breakable link holds the two retracting pins such that the two release springs are compressed by the breakable link exerting force on the retracting pins and the bracket.

13. The release mechanism of claim 2, wherein the at least one cutout is two cutouts on opposite sides of the housing structure.

14. A method for releasing a deployable from a satellite, the method comprising:
affixing the deployable to a frame of the satellite via a release mechanism comprising:
a housing structure attached to the frame and including at least one cutout having a release block therein, the release block attached to the deployable;
at least one retracting pin supported in the housing structure;
at least one release spring exerting force on the at least one pin and housing structure;
a breakable link holding the at least one retracting pin such that the at least one release spring is compressed and the at least one retracting pin at least partially extends through the housing structure and the release block to hold the release block in the at least one cutout and couple the release block to the housing structure; and
a circuit board connected to the housing, the circuit board including at least one heating device; and
applying a current to the heating device to cause the heating device to generate heat to compromise the breakable link such that the at least one release spring retracts the at least one retracting pin from the release block to uncouple the release block from the housing structure and release the deployable.

15. The method of claim 14, wherein:
the at least one retracting pin is two retracting pins; and
the at least one release spring is two release springs.

16. The method of claim 15, wherein the release mechanism is no more than 0.1875 inches thick.

17. The method of claim 16, wherein the applying the current to the heating device comprises applying a 4 Amp current at 3.3 Volts for two seconds or less to the heating device.

18. The method of claim 17, wherein the satellite is a small satellite or nanosatellite and the deployable is a solar panel or antenna.

19. A satellite, the satellite comprising:
a frame;
a deployable of the satellite; and
a release mechanism affixing the deployable to the frame, the release mechanism comprising:
a housing structure including at least one cutout that receives a release block attached to the deployable of the satellite;
at least one retracting pin supported in the housing structure;
at least one release spring that exerts force on the at least one pin and housing structure;
a breakable link that holds the at least one retracting pin such that the at least one release spring is compressed and the at least one retracting pin at least partially extends through the housing structure and the release block to hold the release block in the at least one cutout and couple the release block to the housing structure; and
a circuit board connected to the housing, the circuit board including at least one heating device that heats the breakable link to compromise the breakable link such that the at least one release spring retracts the at least one retracting pin from the release block to uncouple the release block from the housing structure.

20. The satellite of claim 19, wherein the release mechanism is no more than 0.1875 inches thick.

\* \* \* \* \*